(12) United States Patent
Hackbarth et al.

(10) Patent No.: US 7,255,206 B1
(45) Date of Patent: Aug. 14, 2007

(54) SHOPPING CART BRAKE

(76) Inventors: Christina L. Hackbarth, 220 Summit Ave., Watertown, WI (US) 53094; Timothy Hackbarth, 220 Summit Ave., Watertown, WI (US) 53094

( * ) Notice: Subject to any disclaimer, the term of this patent is extended or adjusted under 35 U.S.C. 154(b) by 210 days.

(21) Appl. No.: 11/073,212

(22) Filed: Mar. 5, 2005

(51) Int. Cl.
*B62B 5/04* (2006.01)

(52) U.S. Cl. .................. 188/19; 188/28; 188/2 D; 280/33.994

(58) Field of Classification Search ........... 188/1.12, 188/2 D, 19, 28, 72.6, 24.12, 24.18, 20, 21, 188/22; 280/33.991, 33.994
See application file for complete search history.

(56) References Cited

U.S. PATENT DOCUMENTS

| | | | |
|---|---|---|---|
| 3,376,954 A * | 4/1968 | Neptune | 280/33.994 |
| 3,945,472 A * | 3/1976 | Peters et al. | 188/22 |
| 3,951,426 A * | 4/1976 | Shaffer et al. | 188/21 |
| 3,968,974 A * | 7/1976 | Wetzel | 188/22 |
| 4,840,388 A | 6/1989 | Doughty | |
| 4,862,999 A * | 9/1989 | Rakover | 188/24.18 |
| 4,976,447 A | 12/1990 | Batson | |
| 5,090,517 A | 2/1992 | Doughty | |
| 5,325,938 A | 7/1994 | King | |
| 5,393,081 A * | 2/1995 | Mortenson | 188/22 |
| D362,529 S | 9/1995 | Hilaire, Jr. et al. | |
| 5,499,697 A | 3/1996 | Trimble et al. | |
| 5,735,367 A | 4/1998 | Brubaker | |
| 6,481,540 B1 | 11/2002 | Nolting, Jr. et al. | |
| 6,817,451 B1 * | 11/2004 | Chen | 188/20 |
| 2003/0155189 A1 * | 8/2003 | Everett | 188/24.12 |
| 2004/0124040 A1 * | 7/2004 | Crowley | 188/19 |

FOREIGN PATENT DOCUMENTS

GB      2370618 A * 7/2002

* cited by examiner

*Primary Examiner*—Thomas Williams

(57) ABSTRACT

Shopping cart brakes slow or render a shopping cart immobile. A brake lever has one end pivotably connected to a clamp that is attached to one end of a vertical member of a shopping cart adjacent to its handle. Two brake cables are enclosed by brake cable housings and have one end connected to the brake lever. A plurality of brake cable supports secures the brake cable housings to the vertical member. Alternatively, the brake cables and brake cable housings can be enclosed by vertical members and a horizontal member. The opposing end of the brake cables is attached to calipers. The calipers have brake pads removably connected to them. A brake lever housing is also connected to the clamp. The brake lever housing is attached to an adjuster barrel and houses a brake lever locking mechanism comprising a locking tab, locking button, slot, and locking button hole.

6 Claims, 5 Drawing Sheets

SHOPPING CART BRAKE

BACKGROUND OF THE INVENTION

1. Field of the Invention

The present invention relates to a shopping cart brake for use in connection with shopping carts. The shopping cart brake has particular utility in connection with slowing or rendering a shopping cart immobile.

2. Description of the Prior Art

Shopping cart brakes are desirable for slowing or rendering a shopping cart immobile. Shopping carts are essential aids when purchasing large quantities of goods. However, shopping carts pose a danger to pedestrians and vehicles, especially when they are heavily laden. Sloped parking lots can cause shopping carts to roll away, potentially injuring pedestrians or colliding with parked or moving vehicles. Furthermore, if a child is seated in the shopping cart when it rolls away, the child risks injury. Shopping cart brakes allow the user to slow a shopping cart to the desired speed or render it immobile so that it cannot roll away. This makes it easier to control the shopping cart and unload its contents into a vehicle even if the parking lot is sloped. The ability to render the shopping cart immobile also prevents a child from pushing the shopping cart into items on the shelves or other shoppers when the user must leave the cart unattended.

The use of apparatuses for restraining the movement of wheeled carts is known in the prior art. For example, U.S. Pat. No. 4,976,447 to Batson discloses an apparatus for restraining the movement of wheeled carts. However, the Batson '447 patent does not have calipers, and has further drawbacks of not allowing the user to control the amount of braking applied to a shopping cart.

U.S. Pat. No. 4,840,388 to Doughty discloses a grocery cart that automatically brakes at least one of the cart wheels when not in use. However, the Doughty '388 patent does not have calipers, and additionally does not allow the user to move the cart without holding the graspable portion at all times to release the brake.

Similarly, U.S. Pat. No. 5,735,367 to Brubaker discloses a hand operated shopping cart brake that precludes the movement of a shopping cart unless an associated handle lever is biased. However, the Brubaker '367 patent does not have calipers, and does not allow the user to move the cart without holding the hand lever at all times to release the brake.

In addition, U.S. Pat. No. Des. 362,529 to Hilaire, Jr. et al. discloses shopping cart manual brakes that restrain a shopping cart. However, the Hilaire, Jr. et al. '529 patent does not have calipers, and also does not have brake cables.

Furthermore, U.S. Pat. No. 6,481,540 to Nolting, Jr. et al. discloses a cart brake release handle that selectively impedes movement of a shopping cart. However, the Nolting, Jr. et al. '540 patent does not have calipers, and further lacks the ability for the user to control the amount of braking applied to a shopping cart.

U.S. Pat. No. 5,090,517 to Doughty discloses a braking system for a grocery cart or the like that automatically brakes a user-propelled cart. However, the Doughty '517 patent does not have calipers, and has the additional deficiency of not allowing the user to control the amount of braking applied to a shopping cart.

In addition, U.S. Pat. No. 5,499,697 to Trimble et al. discloses a shopping cart automatic dual brake that automatically applies brakes to the wheels of a shopping cart. However, the Trimble et al. '697 patent does not have calipers, and also does not allow the user to move the cart without lifting the front brake release bar at all times to release the brake.

Lastly, U.S. Pat. No. 5,325,938 to King discloses an automatic shopping cart brake engaged by nesting of carts that provides an automatic brake which remains engaged to hold the cart in a stationary position unless the user manually disengages the brake of the cart for moving the cart. However, the King '938 patent does not have calipers, and further lacks the ability for the user to move the cart without squeezing the handle at all times to release the brake.

While the above-described devices fulfill their respective, particular objectives and requirements, the aforementioned patents do not describe a shopping cart brake that allows slowing or rendering a shopping cart immobile. The above patents make no provision for calipers. The Batson '447 patent, the Nolting, Jr. et al. '540 patent, and the Doughty '517 patent do not allow the user to control the amount of braking applied to a shopping cart. The Doughty '388 patent, the Brubaker '367 patent, the Trimble et al. '697 patent, and the King '938 patent require the user to hold something at all times to release the brake in order to move the shopping cart. The Hilaire, Jr. et al. '529 patent lacks brake cables.

Therefore, a need exists for a new and improved shopping cart brake that can be used for slowing or rendering a shopping cart immobile. In this regard, the present invention substantially fulfills this need. In this respect, the shopping cart brake according to the present invention substantially departs from the conventional concepts and designs of the prior art, and in doing so provides an apparatus primarily developed for the purpose of slowing or rendering a shopping cart immobile.

SUMMARY OF THE INVENTION

In view of the foregoing disadvantages inherent in the known types of apparatuses for restraining the movement of wheeled carts now present in the prior art, the present invention provides an improved shopping cart brake, and overcomes the above-mentioned disadvantages and drawbacks of the prior art. As such, the general purpose of the present invention, which will be described subsequently in greater detail, is to provide a new and improved shopping cart brake which has all the advantages of the prior art mentioned heretofore and many novel features that result in a shopping cart brake which is not anticipated, rendered obvious, suggested, or even implied by the prior art, either alone or in any combination thereof.

To attain this, the present invention essentially comprises a shopping cart, wherein the shopping cart comprises a basket having opposing ends, a plurality of vertical members having opposing ends and a middle with the middle attached to one end of the basket, a lower storage area having opposing ends with one end connected to one end of the vertical members, a horizontal member having opposing ends with the opposing ends connected to the end of the vertical members, a handle having opposing ends with the opposing ends connected to the opposing end of the vertical members, a plurality of front wheels connected to the opposing end of the lower storage area, and a plurality of rear wheels connected to the end of the vertical members, a plurality of calipers releasably frictionally engaged with the rear wheels, a plurality of brake cables having opposing ends with one end connected to the calipers, a brake lever having opposing ends with one end connected to the opposing end of the brake cables, a brake lever housing, wherein the opposing end of the brake cables is inserted through the brake lever housing, and a clamp having opposing ends with one end connected to the handle, wherein the end of the brake lever is pivotably attached to the opposing end of the clamp.

There has thus been outlined, rather broadly, the more important features of the invention in order that the detailed description thereof that follows may be better understood and in order that the present contribution to the art may be better appreciated.

The invention may also include a brake cable support encircling at least one of the brake cables and one of the vertical members. There may be a plurality of brake pads removably attached to the calipers. There may be a plurality of brake cable housings encircling the brake cables. There may be a brake lever locking mechanism connected to the brake lever housing. The brake lever locking mechanism may comprise a slot, wherein the brake lever housing defines a slot therein to comprise the slot, a locking button hole, wherein the brake lever housing defines a hole therein to comprise the locking button hole, a locking button having opposing ends with one end inserted through the slot, a locking tab having opposing ends, a top, a bottom, and a middle with the top of the middle connected to the opposing end of the locking button and one of the ends releasably frictionally engaged with the brake lever, and a spring having opposing ends with one end connected to the bottom of the middle of the locking tab and its opposing end connected to the brake lever housing. The brake cables may be made of wire. The brake pads may be made of rubber. The vertical and horizontal members may be hollow. The vertical and horizontal members may enclose the brake cables. There may be an adjuster barrel connected to the brake lever housing. The invention may be an improvement to a shopping cart. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shopping cart brake that has all of the advantages of the prior art apparatuses for restraining the movement of wheeled carts and none of the disadvantages.

It is another object of the present invention to provide a new and improved shopping cart brake that may be easily and efficiently manufactured and marketed.

An even further object of the present invention is to provide a new and improved shopping cart brake that has a low cost of manufacture with regard to both materials and labor, and which accordingly is then susceptible of low prices of sale to the consuming public, thereby making such shopping cart brake economically available to the buying public.

Still another object of the present invention is to provide a new shopping cart brake that provides in the apparatuses and methods of the prior art some of the advantages thereof, while simultaneously overcoming some of the disadvantages normally associated therewith.

Even still another object of the present invention is to provide a shopping cart brake for slowing or rendering a shopping cart immobile. This allows the user to control the amount of braking applied to the shopping cart.

Still yet another object of the present invention is to provide a shopping cart brake for slowing or rendering a shopping cart immobile. This makes it possible to prevent shopping carts from rolling away on sloped parking lots.

An additional object of the present invention is to provide a shopping cart brake for slowing or rendering a shopping cart immobile. This prevents damage to vehicles.

A further object of the present invention is to provide a shopping cart brake for slowing or rendering a shopping cart immobile. This prevents injury to pedestrians.

Lastly, it is an object of the present invention to provide a new and improved shopping cart brake for slowing or rendering a shopping cart immobile.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
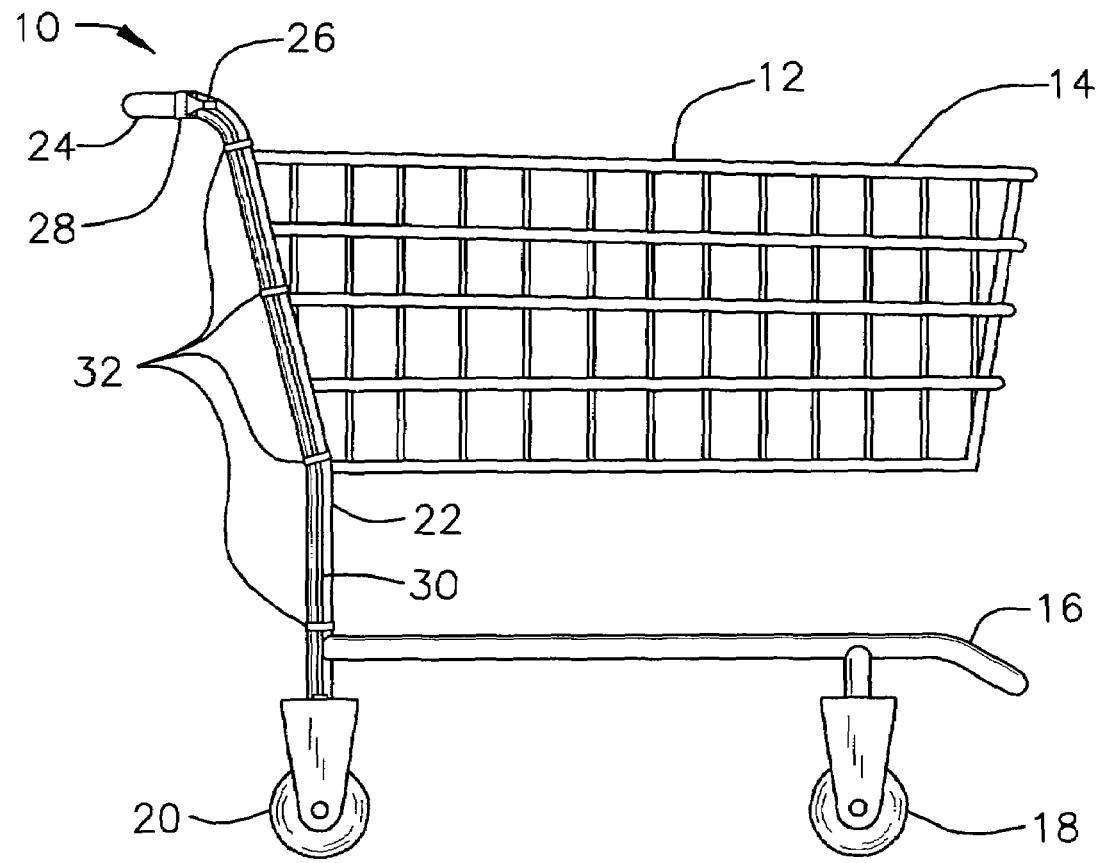
FIG. 1 is a right side view of the current embodiment of the shopping cart brake constructed in accordance with the principles of the present invention.

Referring now to the drawings, and particularly to FIGS. 1-6, a current embodiment of the shopping cart brake of the present invention is shown and generally designated by the reference numeral 10.

In FIG. 1, a new and improved shopping cart brake 10 of the present invention for slowing or rendering a shopping cart immobile is illustrated and will be described. More particularly, the shopping cart brake 10 has a brake lever 26 with one end pivotably connected to a clamp 28 that is attached to one end of a vertical member 22 of a shopping cart 12 adjacent to its handle 24. A brake cable 50 (not visible) is enclosed by a brake cable housing 30. The brake cable housing 30 protects the brake cable 50 from damage. A plurality of brake cable supports 32 secure the brake cable housing 30 to the vertical member 22. The shopping cart 12 has a basket 14 with one end connected to the middle of the vertical member 22 and a lower storage area 16 with one end connected to the opposing end of the vertical member 22. A rear wheel 20 is connected to the opposing end of the vertical member 22, and a front wheel 18 is connected to the opposing end of the lower storage 16.

Figure 2:
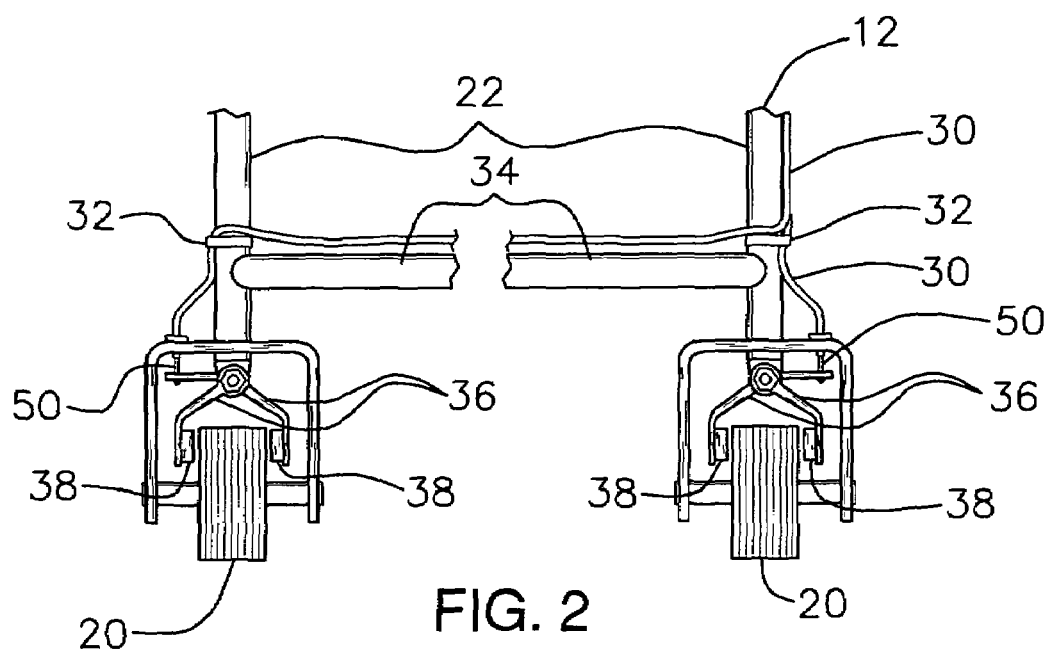
FIG. 2 is a rear side fragmentary view of the rear wheels of the present invention.

Moving on to FIG. 2, new and improved rear wheels 20 of the present invention for slowing or rendering a shopping cart immobile are illustrated and will be described. More particularly, the rear wheels 20 are connected to one end of the vertical members 22. A horizontal member 34 connects the ends of the vertical members 22 to one another. The brake cable housings 30 enclose brake cables 50 and are attached to the vertical members 22 by brake cable supports 32. One end of the brake cables 50 are attached to calipers 36. The calipers 36 have brake pads 38 that frictionally engage with the rear wheels 20 to slow or stop the shopping cart 12 when the user squeezes the brake lever 26 (not shown) to pull the brake cables 50. In the current embodiment, the brake cables 50 are made of wire. The brake pads 38 are made of rubber in the current embodiment so as to not damage the rear wheels 20 and are removably attached to the calipers 36 so that the brake pads 38 can be replaced when they become worn. In the current embodiment, the calipers 36 are biased by springs to pull the brake pads 38 away from the rear wheels 20.

Figure 3:
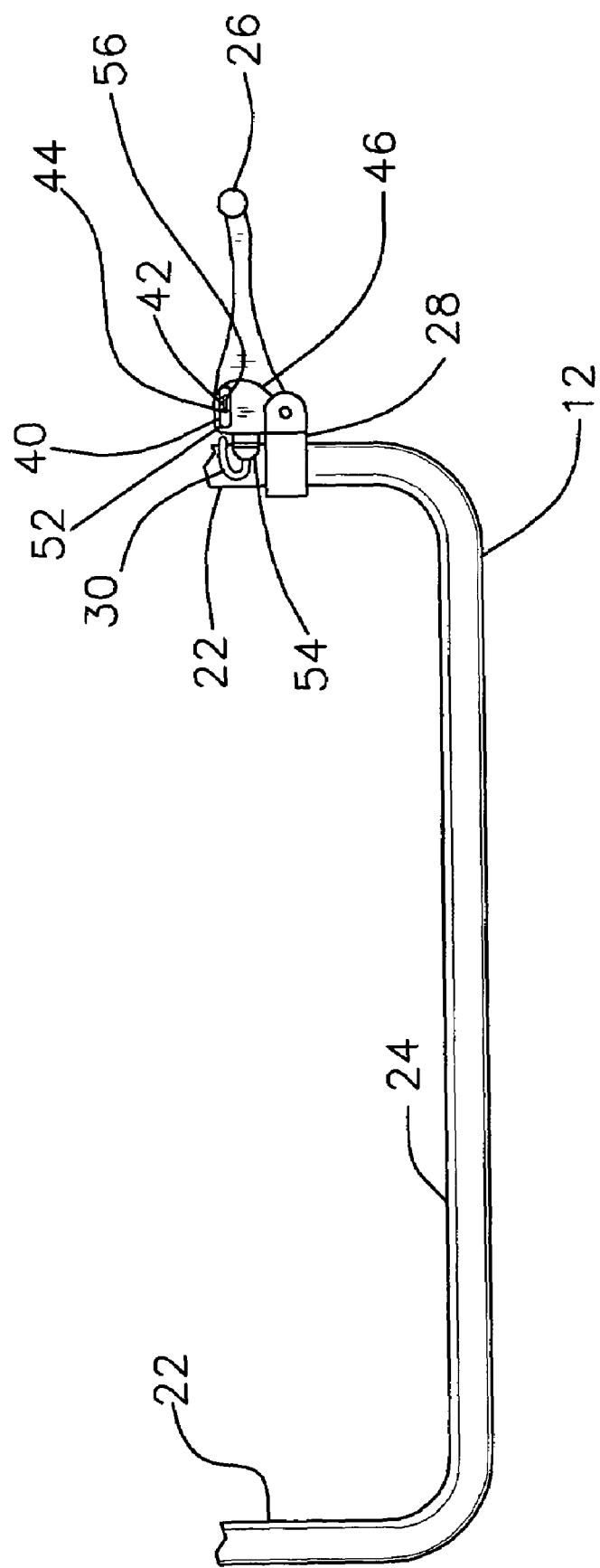
FIG. 3 is a top side view of the handle of the present invention.

Continuing with FIG. 3, a new and improved handle 24 of the present invention for slowing or rendering a shopping cart immobile is illustrated and will be described. More particularly, the handle 24 has its opposing ends connected to one end of the vertical members 22. One end of a clamp 28 is attached to one of the vertical members 22 adjacent to where the vertical member 22 is connected to the handle 24. A brake lever housing 46 has one end attached to the opposing end of the clamp 28. A brake lever 26 has one end pivotably connected to the opposing end of the clamp 28. The brake lever housing 46 has a slot 42 and a locking button hole 56 in its opposing end with one end of a locking button 44 protruding from the slot 42. The opposing end of the locking button 44 is attached to the middle of a locking tab 40. The slot 42, locking button 44, locking button hole 56, and locking tabs 40 comprise a brake lever locking mechanism 52 that is used to immobilize the shopping cart 12, which will be explained in detail in the discussion of FIGS. 4, 5a, and 5b. The brake lever locking mechanism 52 is pictured in its unlocked position, which allows the user to freely roll the shopping cart 12. One end of the brake cable housing 30 is connected to one end of an adjuster barrel 54, and the opposing end of the adjuster barrel 54 is attached to the brake lever housing 46. The adjuster barrel 54 is used to adjust the tension of the brake cable 50 (not shown). In the current embodiment, the brake lever 26 is biased by a spring to rest against the brake lever housing 46.

Figure 4:
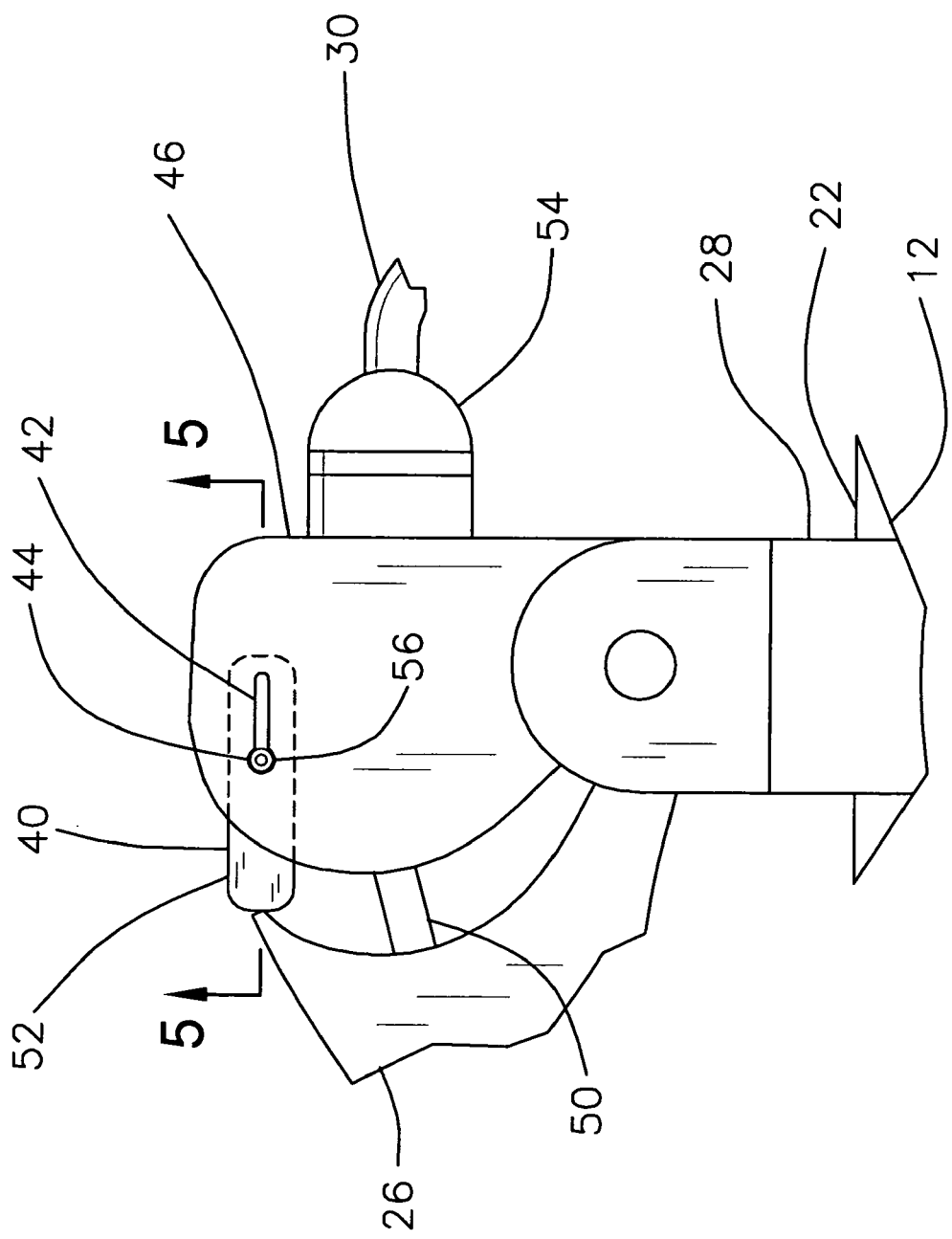
FIG. 4 is a top side fragmentary view of the brake lever housing of the present invention.

In FIG. 4, a new and improved brake lever housing 30 of the present invention for slowing or rendering a shopping cart immobile is illustrated and will be described. More particularly, the brake lever housing 30 has one end of a clamp 28 attached to one end and a slot 42 in its opposing end. A locking button 44 has one end protruding through the slot 42 and locking button hole 56 and its opposing end connected to the top of the middle of a locking tab 40. A brake lever 26 has one end pivotably attached to the end of the clamp 28. The opposing end of the clamp 28 is attached to one of the vertical members 22 of the shopping cart 12. One end of the brake cable 50 is inserted through the adjuster barrel 54 and brake lever housing 46 and connected to the brake lever 26. One end of the brake cable housing 30 is connected to one end of the adjuster barrel 54. The brake lever locking mechanism 52 is depicted in its locked position with the locking tab 40 holding brake lever 26 in a position that pulls the brake cables 50 (only one of which is shown), thereby squeezing the brake pads 38 (not shown) against the rear wheels 20 (not shown). The brake pads 38 prevent the rear wheels 20 from turning, thereby immobilizing the shopping car 12. The user unlocks the brake lever locking mechanism 52 by depressing the locking button 44 and sliding it to the opposite end of the slot 42.

Figure 5A:
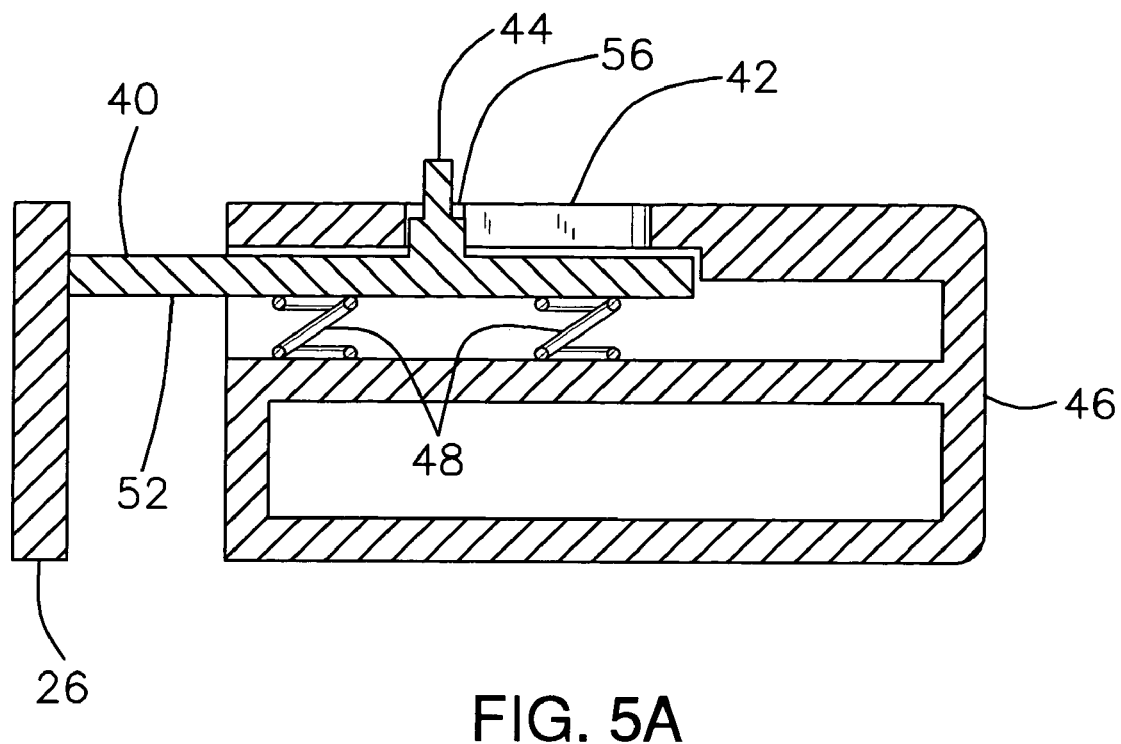
FIG. 5a is a side sectional view of the brake lever locking mechanism of the present invention.

Furthermore, in FIG. 5a, a new and improved brake lever locking mechanism 52 of the present invention for slowing or rendering a shopping cart immobile is illustrated and will be described. More particularly, the brake lever locking mechanism 52 has a locking button 44 with one end protruding from a slot 42 in a brake lever housing 46. The opposing end of the locking button 44 is attached to the top of the middle of a locking tab 40. A plurality of springs 48 has one end attached to the brake lever housing 46 and its opposing end attached to the bottom of the middle of the locking tab 40. When the user has slid the locking button 44 within the slot 42 to align the locking button 44 with the locking button hole 56, the springs 48 push the locking button 44 into the locking button hole 56 to prevent the brake lever 26 from displacing the locking tab 40. The locking tab 40 holds brake lever 26 in a position that pulls the brake cables 50 (not shown), thereby squeezing the brake pads 38 (not shown) against the rear wheels 20 (not shown). The brake pads 38 prevent the rear wheels 20 from turning, thereby immobilizing the shopping cart 12. The user unlocks the brake lever locking mechanism 52 by depressing the locking button 44 and sliding it to the opposite end of the slot 42.

Figure 5B:
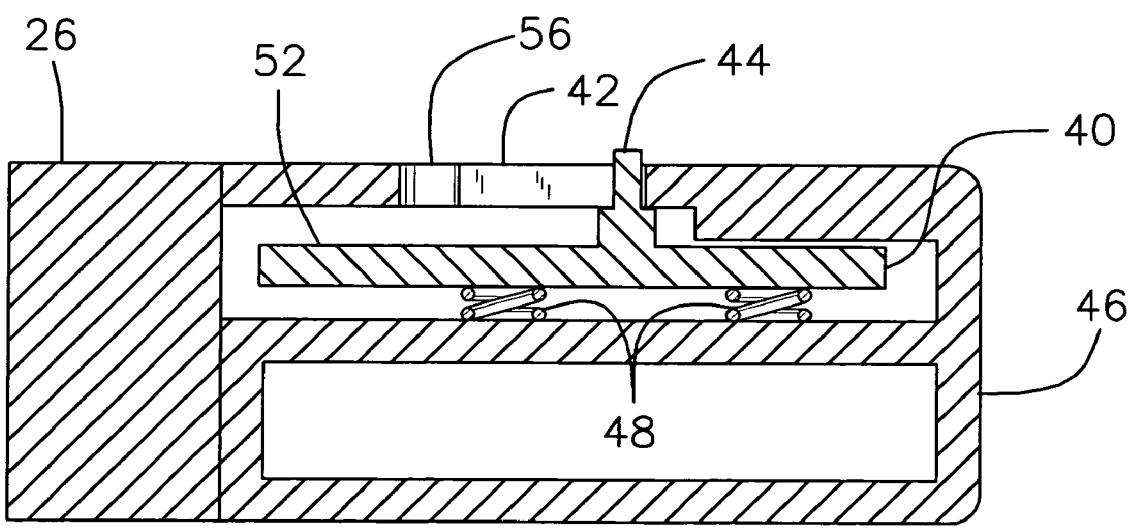
FIG. 5b is a side sectional view of the brake lever locking mechanism of the present invention.

In FIG. 5b, a new and improved brake lever locking mechanism 52 of the present invention for slowing or rendering a shopping cart immobile is illustrated and will be described.

More particularly, the brake lever locking mechanism 52 has a locking button 44 with one end protruding from a slot 42 in a brake lever housing 46. The opposing end of the locking button 44 is attached to the top of the middle of a locking tab 40. A plurality of springs 48 has one end attached to the brake lever housing 46 and its opposing end attached to the bottom of the middle of the locking tab 40. When the user has slid the locking button 44 within the slot 42 to align the locking button 44 with the end of the slot 42 opposite the locking button hole 56, the brake lever 26 can rest against the brake lever housing 46. In this position, the brake lever 26 does not place the brake cables 50 (not shown) in tension, and the calipers 36 keep the brake pads 38 away from the rear wheels 20. This allows the rear wheels 20 to turn, thereby allowing the user to move the shopping cart 12. The user locks the brake lever locking mechanism 52 by sliding the locking button 44 to the opposite end of the slot 42 until the springs 48 push it through the locking button hole 56.

Figure 6:
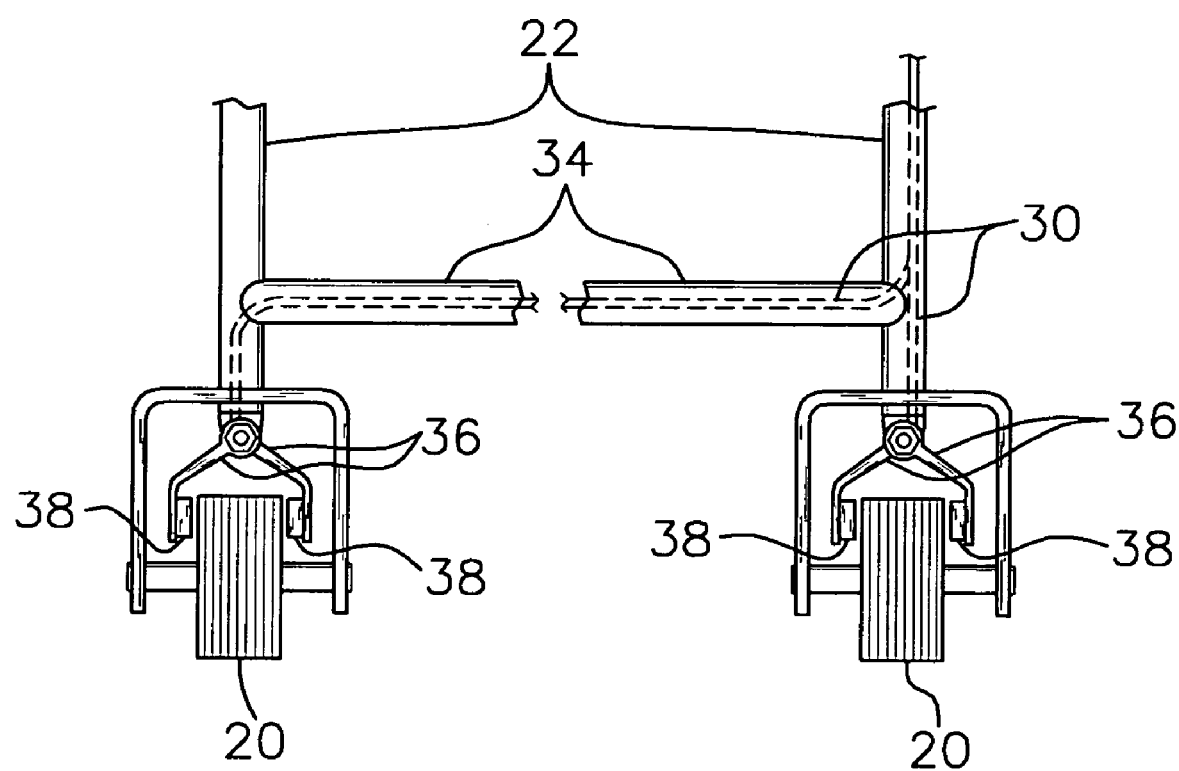
FIG. 6 is a side sectional view of an alternative embodiment of the rear wheels of the present invention.

Concluding with FIG. 6, an alternative embodiment of new and improved rear wheels 20 of the present invention for slowing or rendering a shopping cart immobile is illustrated and will be described. More particularly, in the alternative embodiment, the rear wheels 20 are connected to one end of the vertical members 22. A horizontal member 34 connects the ends of the vertical members 22 to one another. The brake cable housings 30 enclose brake cables 50 and are enclosed by the horizontal member 34 and vertical members 22. One end of the brake cables 50 (not visible) are attached to calipers 36. The calipers 36 have brake pads 38 that frictionally engage with the rear wheels 20 to slow or stop the shopping cart 12 when the user squeezes the brake lever 26 (not shown) to pull the brake cables 50. The brake pads 38 are made of rubber in the current embodiment so as to not damage the rear wheels 20 and are removably attached to the calipers 36 so that the brake pads 38 can be replaced when they become worn. In the current embodiment, the calipers 36 are biased by springs to pull the brake pads 38 away from the rear wheels 20.

In use, it can now be understood that the user unlocks the brake lever locking mechanism 52 by depressing the locking button 44 and sliding it to the end of the slot 42 opposite the locking button hole 56. The user can then move the shopping cart 12 as desired. If the user desires to slow or stop the shopping cart 12, he or she squeezes the brake lever 26 to pull the brake cables 50. The brake cables 50 in turn pull the calipers 36 to squeeze the brake pads 38 against the rear wheels 20. The user controls the amount of braking force applied to the shopping cart 12 by the amount he or she displaces the brake lever 26. Once the shopping cart 12 is stop, the user can immobilize it by locking the brake lever locking mechanism 52. This is accomplished by sliding the locking button 44 within the slot 42 until it protrudes from the locking button hole 56. This action displaces the brake lever 26, which pulls the brake cables 50. The brake cables 50 in turn pull the calipers 36 to squeeze the brake pads 38 against the rear wheels 20. The locking tab 40 holds the brake lever 26 in place until the user depresses the locking button 44 to unlock the brake lever locking mechanism 52.

While a current embodiment of the shopping cart brake has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable material may be used instead of the wire brake cables described. Also, the rubber brake pads may also be made of plastic or similar material. And although slowing or rendering a shopping cart immobile has been described, it should be appreciated that the shopping cart brake herein described is also suitable for slowing or rendering a stroller immobile.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A shopping cart brake comprising:
   a shopping cart, wherein said shopping cart comprises a basket having opposing ends, a plurality of vertical members having opposing ends and a middle with said middle attached to one end of said basket, a lower storage area having opposing ends with one end connected to one end of said vertical members, a horizontal member having opposing ends with said opposing ends connected to said end of said vertical members, a handle having opposing ends with said opposing ends connected to said opposing end of said vertical members, a plurality of front wheels connected to said opposing end of said lower storage, and a plurality of rear wheels connected to said end of said vertical members;
   a plurality of calipers releasably frictionally engaged with said rear wheels;
   a plurality of brake cables having opposing ends with one end connected to said calipers;
   a brake lever having opposing ends with one end connected to said opposing end of said brake cables;
   a brake lever housing, wherein said opposing end of said brake cables is inserted through said brake lever housing; and
   a single clamp having opposing ends with one end connected to only one of said opposing ends of said handle, wherein said end of said brake lever is pivotably attached to said opposing end of said clamp;
   a brake lever locking mechanism connected to said brake lever housing, said brake lever locking mechanism comprising:
      a slot, wherein said brake lever housing defines said slot;
      a locking button hole, wherein said brake lever housing defines said locking button hole;
      a locking button having opposing ends with one end inserted through said slot;
      a locking tab having opposing ends, a top, a bottom, and a middle with said top of said middle connected to said opposing end of said locking button and one of said ends releasably frictionally engaged with said brake lever; and
      a spring having opposing ends with one end connected to said bottom of said middle of said locking tab and said opposing end connected to said brake lever housing.

2. A shopping cart brake comprising:
   a shopping cart, wherein said shopping cart comprises a basket having opposing ends, a plurality of hollow vertical members having opposing ends and a middle with said middle attached to one end of said basket, a lower storage area having opposing ends with one end connected to one end of said vertical members, a hollow horizontal member having opposing ends with said opposing ends connected to said end of said vertical members, a handle having opposing ends with said opposing ends connected to said opposing end of said vertical members, a plurality of front wheels connected to said opposing end of said lower storage, and a plurality of rear wheels connected to said end of said vertical members;

a plurality of calipers releasably frictionally engaged with said rear wheels;

a plurality of brake cables having opposing ends with one end connected to said calipers, wherein said brake cables are enclosed by one of said vertical members and one of said brake cables is enclosed by said horizontal member;

a brake lever having opposing ends with one end connected to said opposing end of said brake cables;

a brake lever housing, wherein said opposing end of said brake cables is inserted through said brake lever housing;

a single clamp having opposing ends with one end connected to only one of said opposing ends of said handle, wherein said end of said brake lever is pivotably attached to said opposing end of said clamp;

a slot, wherein said brake lever housing defines said slot;

a locking button hole, wherein said brake lever housing defines said locking button hole;

a locking button having opposing ends with one end inserted through said slot;

a locking tab having opposing ends, a top, a bottom, and a middle with said top of said middle connected to said opposing end of said locking button and one of said ends releasably frictionally engaged with said brake lever; and a spring having opposing ends with one end connected to said bottom of said middle of said locking tab and said opposing end connected to said brake lever housing.

3. In combination with a shopping cart, including a plurality of vertical members having opposing ends, a handle having opposing ends, and a plurality of rear wheels, the improvement which comprises:

a plurality of brake pads releasably frictionally engaged with said rear wheels;

a plurality of calipers removably attached to said brake pads;

a plurality of brake cables having opposing ends with one end connected to said calipers;

a brake lever having opposing ends with one end connected to said opposing end of said brake cables;

a brake lever housing, wherein said opposing end of said brake cables is inserted through said brake lever housing; and a single clamp having opposing ends with one end connected to only one of said opposing ends of said handle, wherein said end of said brake lever is pivotably attached to said opposing end of said clamp;

a slot, wherein said brake lever housing defines said slot;

a locking button hole, wherein said brake lever housing defines said locking button hole;

a locking button having opposing ends with one end inserted through said slot;

a locking tab having opposing ends, a top, a bottom, and a middle with said top of said middle connected to said opposing end of said locking button and one of said ends releasably frictionally engaged with said brake lever; and a spring having opposing ends with one end connected to said bottom of said middle of said locking tab and said opposing end connected to said brake lever housing.

4. The shopping cart brake as defined in claim 3, wherein said brake cables are made of wire.

5. The improvement to a shopping cart as defined in claim 4, further comprising:

a plurality of brake cable housings encircling said brake cables; and a brake cable support encircling at least one of said brake cable housings and one of said vertical members.

6. The shopping cart brake as defined in claim 5, wherein said brake pads are made of rubber.

* * * * *